United States Patent
Sambongi

(10) Patent No.: US 8,611,725 B2
(45) Date of Patent: Dec. 17, 2013

(54) PLAYBACK DISPLAY DEVICE, IMAGE CAPTURING DEVICE, PLAYBACK DISPLAY METHOD, AND STORAGE MEDIUM

(75) Inventor: Masao Sambongi, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 174 days.

(21) Appl. No.: 13/232,652

(22) Filed: Sep. 14, 2011

(65) Prior Publication Data

US 2012/0062779 A1    Mar. 15, 2012

(30) Foreign Application Priority Data

Sep. 15, 2010 (JP) ................................ 2010-206244
Nov. 8, 2010 (JP) ................................ 2010-249324

(51) Int. Cl.
*H04N 9/80* (2006.01)
*H04N 5/77* (2006.01)
*H04N 5/775* (2006.01)

(52) U.S. Cl.
USPC ............ 386/248; 386/224; 386/230; 386/239

(58) Field of Classification Search
USPC .................................. 386/223–224, 239–248
See application file for complete search history.

(56) References Cited

U.S. PATENT DOCUMENTS

| | | | |
|---|---|---|---|
| 2002/0154213 A1* | 10/2002 | Sibyama et al. | 348/47 |
| 2004/0218894 A1* | 11/2004 | Harville et al. | 386/46 |
| 2008/0285886 A1 | 11/2008 | Allen | |

FOREIGN PATENT DOCUMENTS

| | | |
|---|---|---|
| JP | 7-288725 A | 10/1995 |
| JP | 8-154228 A | 6/1996 |
| JP | 11-183996 A | 7/1999 |
| JP | 2007-129407 A | 5/2007 |
| KR | 2009-0067391 A | 6/2009 |
| WO | WO 2006/103437 A1 | 10/2006 |

OTHER PUBLICATIONS

Korean Office Action dated Oct. 2, 2012 (and English translation thereof) in counterpart Korean Application No. 10-2011-0092704.
Extended European Search Report (EESR) dated Apr. 3, 2012 (in English) in counterpart European Application No. 11180486.0.

* cited by examiner

*Primary Examiner* — Hung Dang
(74) *Attorney, Agent, or Firm* — Holtz, Holtz, Goodman & Chick, PC

(57) ABSTRACT

A playback display device including: a display unit; a data storage unit which stores data representing a travel route and a plurality of pieces of image data each associated with an image capturing place; a movement display control unit which displays a mark moving on a map displayed on the display unit based on the data representing the travel route; and an image playback unit which displays image data when, while the movement display control unit displays the mark moving on the map, a displayed position of the mark matches a corresponding position of the image capturing place associated with the image data.

6 Claims, 11 Drawing Sheets

FIG. 2

| TRAVEL LOCUS DATA | | | |
|---|---|---|---|
| TIME | POSITION | TRAVEL MEANS | CAPTURED IMAGE |
| YEAR/MONTH/DATE 08:20:00 | LATITUDE *.*° LONGITUDE *.*° | WALKING | NONE |
| YEAR/MONTH/DATE 08:20:10 | LATITUDE *.*° LONGITUDE *.*° | WALKING | JPG00001201 |
| YEAR/MONTH/DATE 08:20:20 | LATITUDE *.*° LONGITUDE *.*° | WALKING | NONE |
| ⋮ | ⋮ | ⋮ | ⋮ |
| YEAR/MONTH/DATE 13:32:00 | LATITUDE *.*° LONGITUDE *.*° | TRAIN | JPG00001203 |
| ⋮ | ⋮ | ⋮ | ⋮ |

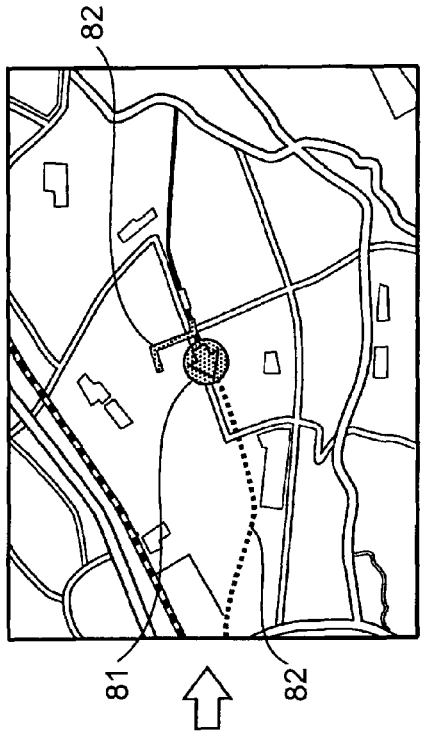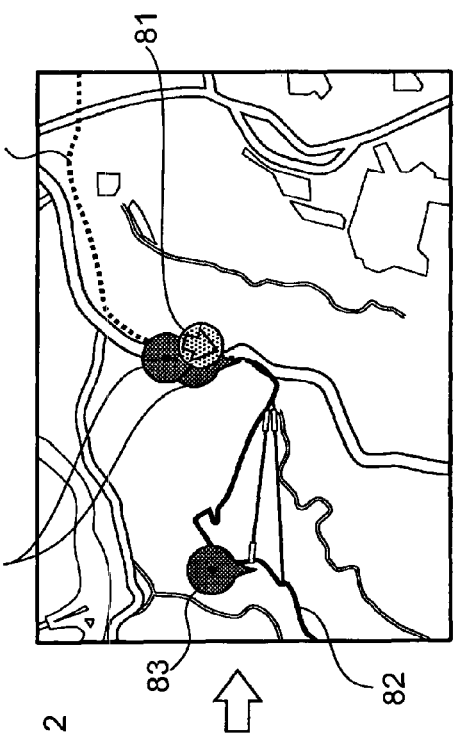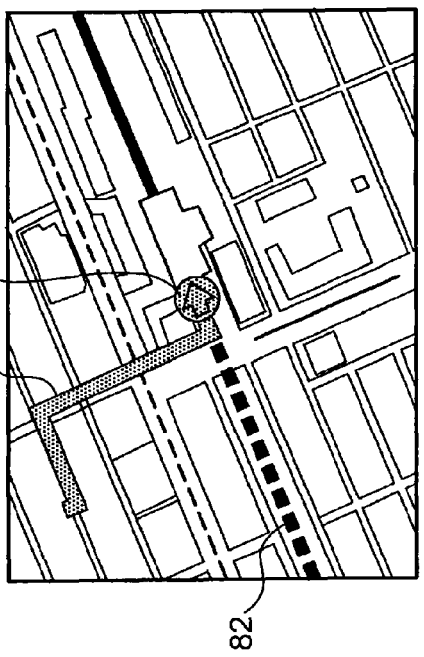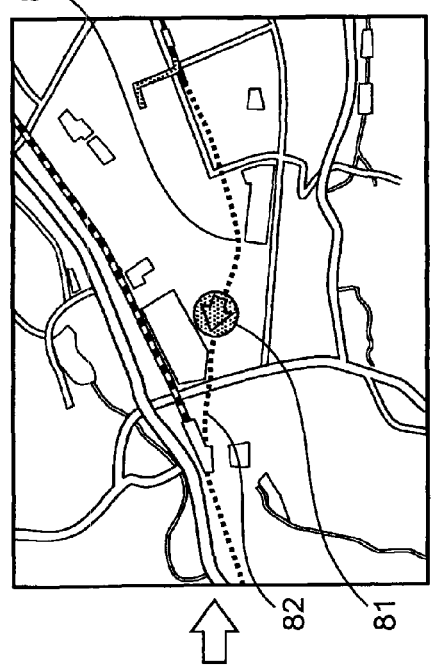

PLAYBACK DISPLAY DEVICE, IMAGE CAPTURING DEVICE, PLAYBACK DISPLAY METHOD, AND STORAGE MEDIUM

BACKGROUND OF THE INVENTION

1. Field of the Invention

This invention relates to a playback display device, a playback display method, and a storage medium to play back a plurality of pieces of image data, and relates to an image capturing device which includes the playback display device.

2. Description of Related Art

Conventional digital cameras have a slide show function in which images captured in the past are displayed one after another.

Further, recent digital cameras have a position measuring device mounted thereon, and have a function of adding position data information about an image capturing place to captured image data and recording the added data, and, in addition to capturing of image data, recording information about a route along which a user travels with a digital camera.

As a technique related to the present invention, Japanese Patent Application Laid-Open No. 11-183996 discloses a technique where, when an image is captured with a camera, the position of the image capturing place is also measured, and position information is added to a video information file and a map information file to be recorded, so as to enable reference to corresponding video information and map information easily.

However, when a slide show function is executed using the camera described in Japanese Patent Application Laid-Open No. 11-183996, even if the camera includes information about a travel route, there is a problem in that the slide show cannot provide enjoyment enough to make a person who looks at the slide show feel as if he or she actually experienced the travel through the whole process of the travel.

SUMMARY OF THE INVENTION

It is therefore an object of the present invention to provide a playback display device, an image capturing device, a playback display method and a recording medium which make a person who looks at the slide show feel as if he or she actually experienced the travel through the whole process of the travel, even when images are intermittently captured by traveling from one image capturing place to another.

According to an aspect of the present invention, there is provided a playback display device including: a display unit; a data storage unit which stores data representing a travel route and a plurality of pieces of image data each associated with an image capturing place; a movement display control unit which displays a mark moving on a map displayed on the display unit based on the data representing the travel route; and an image playback unit which displays image data when, while the movement display control unit displays the mark moving on the map, a displayed position of the mark matches a corresponding position of the image capturing place associated with the image data.

According to another aspect of the present invention, there is provided a playback display method for displaying an image by using a display unit and a data storage unit which stores data representing a travel route and a plurality of pieces of image data each associated with an image capturing place, the method including: (a) displaying a mark moving on a map displayed on the display unit based on the data representing the travel route; and (b) displaying image data when, while displaying the mark moving on the map by step (a), a displayed position of the mark matches a corresponding position of the image capturing place associated with the image data.

According to another aspect of the present invention, there is provided a computer readable storage medium having recorded thereon a computer program for controlling a computer, which is connected to a display unit and a data storage unit which stores data representing a travel route and a plurality of pieces of image data each associated with an image capturing place, wherein the program controls the computer to function as: a movement display control unit which displays a mark moving on a map displayed on the display unit based on the data representing the travel route; and an image playback unit which displays image data when, while the movement display control unit displays the mark moving on the map, a displayed position of the mark matches a corresponding position of the image capturing place associated with the image data.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2 is a data chart illustrating an example of content of travel route data stored in a travel route storage unit;

FIGS. 10A-10D are a first part of explanatory views illustrating an example of display images in the map slide display according to the second embodiment.

DESCRIPTION OF THE PREFERRED EMBODIMENTS

Hereinafter, embodiments of the present invention will be described below with reference to the accompanying drawings.

First Embodiment

Figure 1:
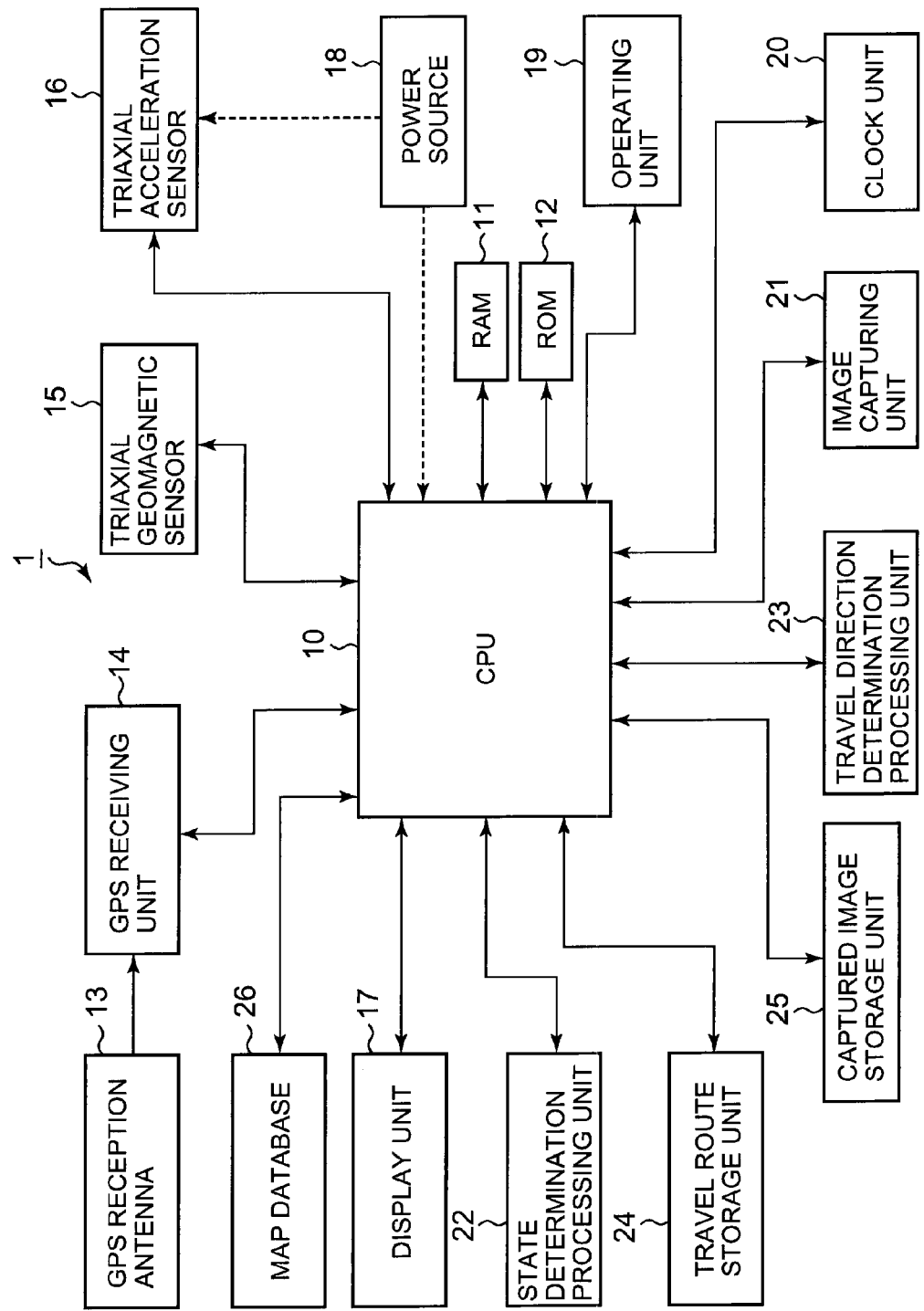
FIG. 1 is a block diagram illustrating an entire configuration of an image capturing device according to an embodiment of the present invention.

FIG. 1 is a block diagram illustrating an entire configuration of an image capturing device according to an embodiment of the present invention.

An image capturing device 1 according to the present embodiment includes a CPU 10, a random access memory (RAM) 11, a read only memory (ROM) 12, a global positioning system (GPS) reception antenna 13, a GPS receiving unit 14, a triaxial geomagnetic sensor 15, a triaxial acceleration sensor 16, a display unit 17, a power source 18, an operating unit 19, a clock unit 20, and an image capturing unit 21. The CPU 10 controls the device as a whole. The RAM 11 provides a work memory space for the CPU 10. The ROM 12 stores a control program executed by the CPU 10 and stores control data. The GPS reception antenna 13 receives signals from GPS satellites. The GPS receiving unit 14 captures and demodulates signals received from the GPS satellites, The triaxial geomagnetic sensor 15 detects the direction of the geomagnetism. The triaxial acceleration sensor 16 detects the respective degrees of accelerations in triaxial directions. The display unit 17 displays images such as picture images or map images. The power source 18 supplies operating voltage to each unit. The operating unit 19 receives inputs of various operation commands from outside through a plurality of operating buttons. The clock unit 20 keeps the current time. The image capturing unit 21 functions as an image capturing unit which converts a captured image of a subject into electronic image data.

Further, the image capturing device 1 includes a state determination processing unit 22, a travel direction determination processing unit 23, a travel route storage unit 24, a captured image storage unit 25, and a map database 26. The state determination processing unit 22 functions as a travel means determination unit which performs computing processing to determine a user's travel means. The travel direction determination processing unit 23 performs computing processing to determine a user's travel direction. The travel route storage unit 24 stores travel route data representing a user's travel route. The captured image storage unit 25 stores image data of a captured image. The map database 26 is a database in which data of map images of a plurality of partitions and a plurality of scales is registered.

A data storage unit is composed of the travel route storage unit 24 and the captured image storage unit 25.

Further, this image capturing device 1 has a configuration encompassing the embodiments of the playback display device according to the present invention.

The GPS receiving unit 14 performs processing of demodulating processing of a signal received through the GPS reception antenna 13 based on the operation command from the CPU 10, and transmits various pieces of transmission data from GPS satellites to the CPU 10.

The CPU 10 acquires position data representing the current position by performing predetermined computation for positioning based on these various pieces of transmission data from GPS satellites.

A positioning unit is composed of the GPS reception antenna 13, the GPS receiving unit 14 and the CPU 10.

The power source 18 supplies operating voltage to each unit through the CPU 10 while the image capturing device 1 is in operation.

On the other hand, the power source 18 supplies operating voltage only to the triaxial acceleration sensor 16 when the image capturing device 1 is on standby.

The triaxial acceleration sensor 16 monitors whether the image capturing device 1 is at rest while the image capturing device 1 is on standby.

When movement of the image capturing device 1 carried by a user is detected, the triaxial acceleration sensor 16 notifies the detection of this movement to the CPU 10, and thereby, the CPU 10 resumes supply of power to each unit.

Further, the image capturing device 1 automatically switches to a working state.

The operating unit 19 includes a plurality of operating buttons for performing an operation for switching between various function modes of the image capturing device 1 and a shutter operation when an image is to be captured.

The state determination processing unit 22 is a computing device which supports processing by the CPU 10.

Further, the state determination processing unit 22 receives an input of sampling data of a sensor signal from the triaxial acceleration sensor 16 through the CPU 10, and determines a user's travel means at a measured time based on the input data.

More specifically, the state determination processing unit 22 determines the travel means among a stop state, walking, running, traveling by bicycle, car or train based on the condition described below in detail.

In sampling data which is output by the triaxial acceleration sensor 16 and which is obtained by walking, running or traveling by bicycle, a cyclic change pattern which represents up and down motions of the body appears.

However, in sampling data which is output by the triaxial acceleration sensor 16 and which is obtained by being in a stop state or traveling by car or train, the cyclic change pattern which represents the up and down motions of the body does not appear.

Hence, the state determination processing unit 22 extracts the above cyclic change pattern from the sampling data output from the triaxial acceleration sensor 16, and makes determination between operation states of the above two groups depending on whether there is the change pattern.

Further, a cycle of fluctuation of the up and down motions of the body and the amount of the fluctuation appears in a different manner between the sampling data of walking, that of running, and that of traveling by bicycle.

More specifically, in sampling data obtained by walking, the fluctuation cycle is equal to or less than 2.6 Hz and an acceleration peak value is 1.3 G to 2.0 G.

Further, in sampling data obtained by running, the fluctuation cycle is 2.3 Hz to 4.3 Hz and the acceleration peak value is equal to or more than 2.0 G.

Furthermore, in sampling data obtained by traveling by bicycle, the fluctuation cycle is 1.6 Hz to 4 Hz, and the acceleration peak value is equal to or less than the threshold of 1.2 G to 2.0 G which changes in proportion to this fluctuation cycle.

Hence, the state determination processing unit 22 extracts the change pattern which fluctuates up and down at a certain cycle, from sampling data output from the triaxial acceleration sensor 16, and measures the cycle of the change pattern and the peak value to determine whether the travel means is walking, running or traveling by bicycle based on this measurement value.

Further, in sampling data obtained by traveling by car or by train, a vibration component of a low frequency (1 to 3 Hz) continuously appears at a certain level in acceleration in the vertical direction upon driving of a vehicle. On the other hand, in sampling data obtained when the vehicle is stopping, this vibration component does not appear.

Furthermore, in sampling data obtained by traveling by car, a vibration component of a low frequency (1 to 3 Hz) continuously appears at a certain level in acceleration in the horizontal direction with respect to the travel direction, and, in sampling data obtained by traveling by train, this vibration component does not appear.

Hence, the state determination processing unit 22 performs Fourier transformation on a vertical direction component for a certain period of time in sampling data output from the triaxial acceleration sensor 16, and extracts the fluctuation amount of a low frequency (1 to 3 Hz) component from the vertical direction component.

Further, the state determination processing unit 22 determines whether the magnitude of the extracted fluctuation amount exceeds a predetermined level, and, thereby, can determine whether a car or train is running or stopping.

Furthermore, the state determination processing unit 22 performs Fourier transformation on two-independent-direction components orthogonal to the vertical component, for a certain period of time, in sampling data output from the triaxial acceleration sensor 16, and extracts the fluctuation amount of a low frequency (1 to 3 Hz) component from the two-independent-direction components.

Still further, the state determination processing unit 22 determines whether the magnitude of the extracted fluctuation amount exceeds a predetermined level, and, thereby, can determine whether a user is traveling by car or train.

In addition, the method of determining the travel means is by no means limited to the above example, and various common determination methods may be employed. For example, the method of calculating the travel speed by GPS positioning and taking information about the travel speed into consideration for determining the travel means may be employed.

The travel direction determination processing unit 23 is a computing device which supports processing by the CPU 10.

Upon walking or running, the travel direction determination processing unit 23 receives an input of sampling data of sensor signals from the triaxial geomagnetic sensor 15 and triaxial acceleration sensor 16 through the CPU 10, and thereby calculates the travel direction.

Upon walking or running, a user's body significantly inclines forward and backward, and slightly rolls in the left and right directions.

In this case, if the image capturing device 1 is attached to a user's body, the image capturing device 1 also moves in the same way as the user's body, and therefore, the output from the triaxial acceleration sensor 16 reflects the motion upon walking or running.

The travel direction determination processing unit 23 analyzes a fluctuation pattern of the output from the triaxial acceleration sensor 16 and, thereby, can calculate in which direction the image capturing device 1 that is attached to a user's body is traveling.

Further, the travel direction determination processing unit 23 can calculate which direction of the image capturing device 1 is the gravity direction based on the output from the triaxial acceleration sensor 16, and can calculate which direction of the image capturing device 1 is the magnetic north direction based on the output from the triaxial geomagnetic sensor 15.

Furthermore, the travel direction determination processing unit 23 can calculate the direction in which a user is traveling as the azimuth direction based on these results.

The CPU 10 acquires data of number of steps from the state determination processing unit 22 upon walking or running as well as performs entire control processing of the image capturing device 1, and further acquires travel direction data from the travel direction determination processing unit 23 to perform positioning processing by autonomous navigation based on the acquired data.

The data of number of steps is obtained by counting for a certain period of time the up and down motions of the body based on a cyclic change pattern which represents the up and down motions of the body which is extracted from the output from the triaxial acceleration sensor 16 by the state determination processing unit 22.

In the positioning processing by autonomous navigation, the CPU 10 first calculates the travel distance by multiplying given data of number of steps and predetermined data of length of strides, and calculates a travel vector composed of the travel distance and travel direction represented by travel direction data.

Further, the place measured by the GPS immediately before is set as a reference place to start autonomous navigation, and the above travel vector is accumulated on the position data of this reference place.

The CPU 10 calculates position data of each place on the way of traveling by means of the accumulation upon walking or running.

The CPU 10 can acquire position data of the detailed travel route upon walking or running by performing positioning by autonomous navigation. That is, it is not necessary to perform detailed positioning by the GPS, which consumes relatively great power.

FIG. 2 is a data chart representing an example of content of travel route data stored in the travel route storage unit 24.

The travel route storage unit 24 accumulates, for example, travel route data illustrated in FIG. 2.

This travel route data includes, for example, position data acquired by performing positioning at each place on the travel route, time data representing the time when the position data is acquired, travel means data (travel means identification information) representing the travel means determined at the time of the positioning, and data of captured image items representing a file name and existence or non-existence of an image which is captured by the image capturing unit 21 at the place where the positioning is performed and which is stored in the captured image storage unit 25.

The ROM 12 stores a program for performing control processing to generate the above travel route data by continuously performing positioning and to capture images or play back images etc. based on an operation input to the operating unit 19.

This program can be stored not only in the ROM 12, but also in a portable storage medium such as an optical disc or a non-volatile memory such as a flash memory or the like, which the CPU 10 can read through the data reading device.

Further, a mode, where this program is downloaded to the image capturing device 1 through a communication line using carrier waves as media, is also applicable.

Next, the functional operation of the image capturing device 1 having the above configuration will be described.

FIGS. 3 to 6 illustrate flowcharts of control processing according to the first embodiment executed by the CPU 10.

Generation of Travel Locus Data

In the image capturing device 1 according to the present embodiment, while the device is in operation, the CPU 10 continuously performs positioning processing and generates travel route data in the travel route storage unit 24.

Figure 3:
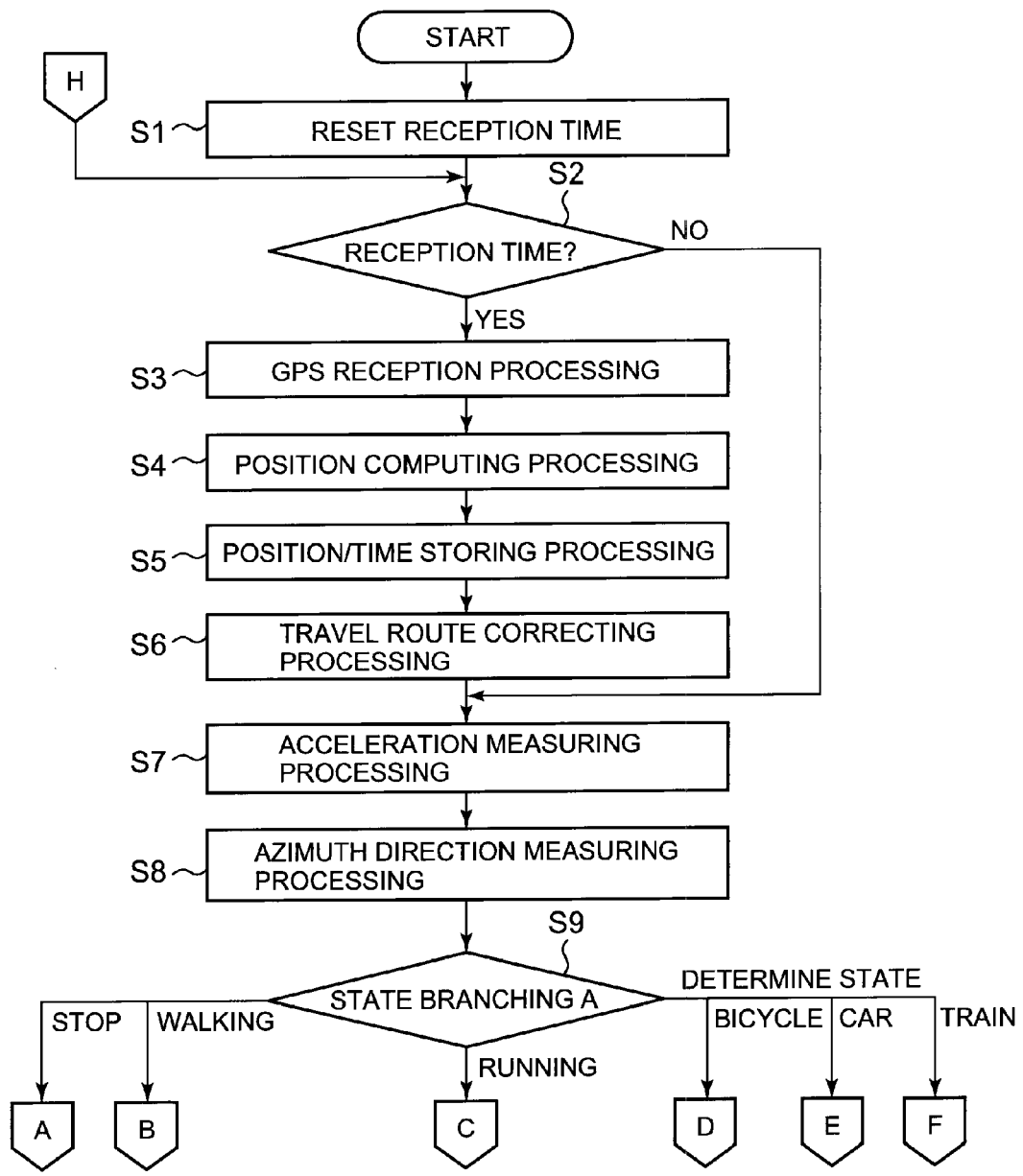
FIG. 3 is a first part of a flowchart illustrating the procedure of control processing according to the first embodiment executed by a central processing unit (CPU)

That is, when the control processing in FIG. 3 starts, the CPU 10 resets the set time to perform GPS reception (step S1).

Subsequently, the CPU 10 repeatedly executes processing in steps S2 to S25 to perform positioning and to generate movement history data in a series of loop processing.

That is, the CPU 10 first checks whether the time for GPS reception has come (step S2), and receives signals from GPS satellites through the GPS reception antenna 13 and GPS receiving unit 14 if the reception time has come (step S3).

The CPU 10 performs predetermined positioning computation based on the received signals and calculates position data representing the current position (step S4), and allows the travel route storage unit 24 to store position data, time data, and travel means data (step S5).

For travel means data, a result of determination of a previous state obtained in step S9 is used.

Further, when position data is acquired immediately before by autonomous navigation, the CPU 10 performs processing to correct the position data acquired by the by the autonomous navigation based on GPS position data (step S6).

Further, irrespective of the GPS reception time, the CPU 10 acquires sampling data for a certain period of time output from the triaxial acceleration sensor 16 and sampling data for a certain period of time from the triaxial geomagnetism sensor 15 (steps S7 and S8).

Further, the CPU 10 transmits these pieces of sampling data to the state determination processing unit 22 to allow the state determination processing unit 22 to determine the state, and performs branching processing based on the result (step S9).

When the state is determined to be a stop state in step S9, the CPU 10 checks whether the state is determined to be the stop state in the previous time (step S10).

When the state is not determined to be the stop state in the previous time, the CPU 10 performs setting processing to set an interval between GPS reception times to the interval for the stop state and to set travel means data, which is to be stored by the travel route storage unit 24 according to the next positioning processing, to "stop state" (step S11).

On the other hand, when the state is determined to be walking in step S9, the CPU 10 checks whether the state is determined to be walking in the previous time (step S12).

When the state is not determined to be walking in the previous time, the CPU 10 performs setting processing to set the interval between GPS reception times to the interval for walking, and to set travel means data, which is to be stored in the travel route storage unit 24 according to the next positioning processing, to "walking" (step S13).

Further, when the state is determined to be walking, the CPU 10 performs positioning processing by autonomous navigation (step S14), and allows the travel route storage unit 24 to store position data, time data, and travel means data indicating "walking" based on the positioning result (step S15).

Further, when the state is determined to be running in step S9, the CPU 10 executes the processing (steps S16 to S19) which are similar to those for walking, the processing being properly changed to correspond to the case of running.

Further, when the state is determined to be traveling by bicycle, car or train in step S9, the CPU 10 checks whether the state is determined to be the same in the previous time, respectively, (steps S20, S22 and S24). If the previous result is not the same, the CPU 10 performs setting processing corresponding to traveling by bicycle, car, or train, respectively (steps S21, S23 and S25).

The above processing in steps S2 to S25 are repeatedly executed at short intervals in a series of loop processing.

In this way, the CPU 10 performs GPS positioning at adequate intervals according to the result of determination of the travel state while a user travels with the image capturing device 1 or performs positioning by autonomous navigation upon walking or running. In this way, the CPU 10 accumulates travel route data in the travel route storage unit 24.

Camera Processing

The image capturing device 1 according to the present embodiment executes processing related to image capturing and display in addition to the above processing of generating travel route data.

Figure 4:
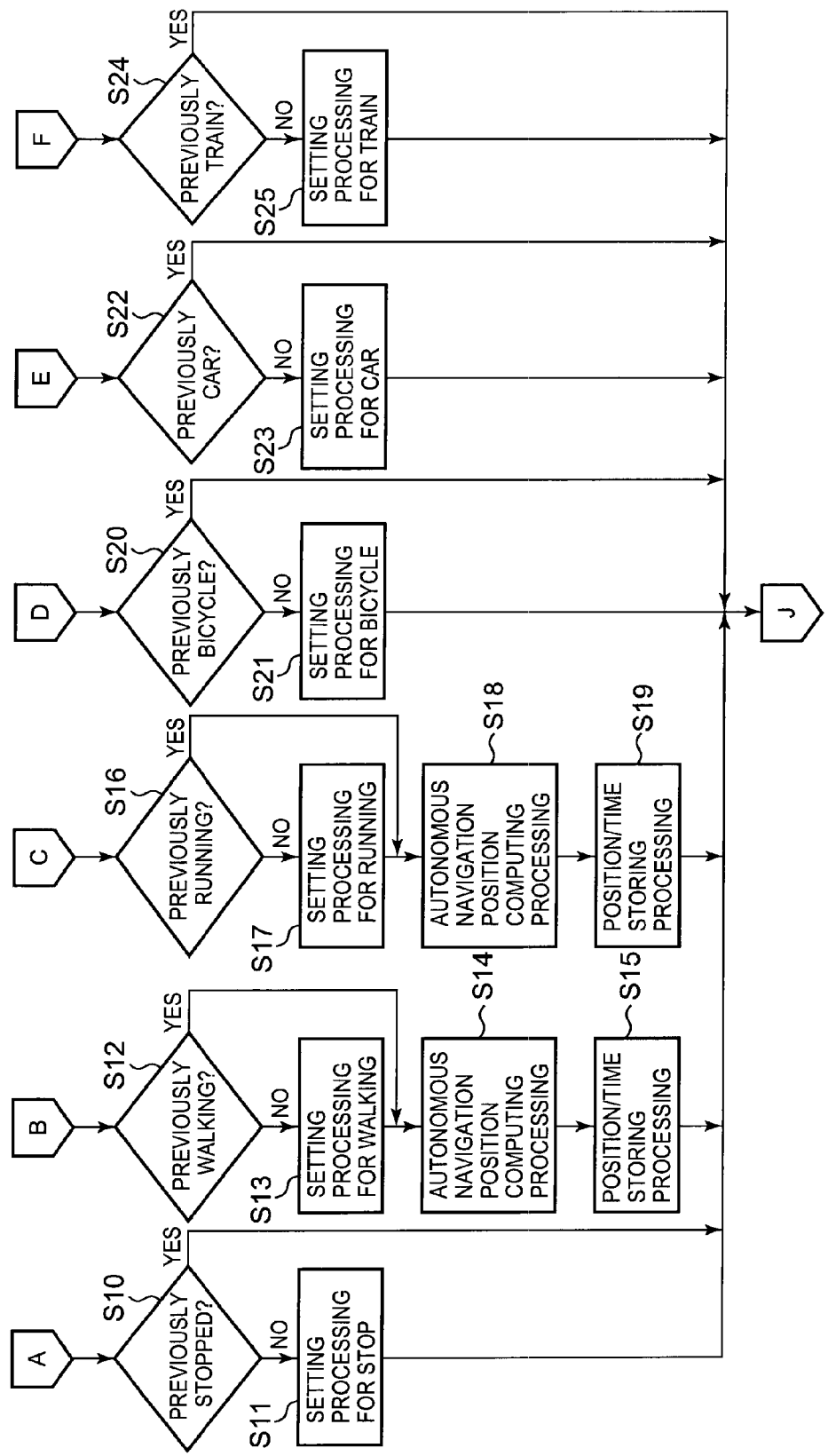
FIG. 4 is a second part of the flowchart of the control processing according to the first embodiment executed by the CPU.
Figure 5:
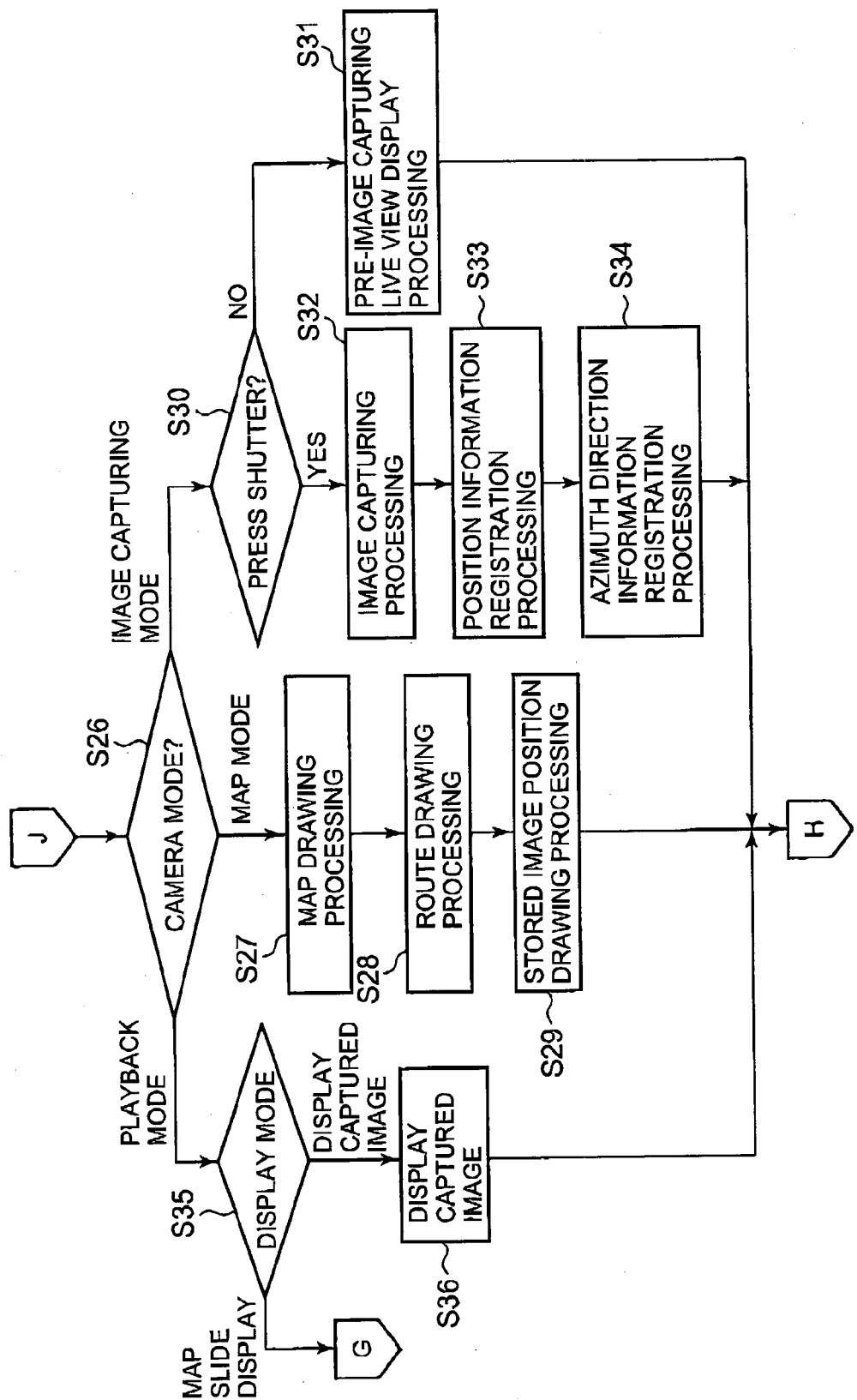
FIG. 5 is a third part of the flowchart of the control processing according to the first embodiment executed by the CPU.

That is, in a series of loop processing of the control processing in FIGS. 3 to 6, the CPU 10 repeatedly executes processing subsequent to step S26 in FIG. 5 related to image capturing and display.

When the CPU 10 moves on to these processing, the CPU 10 first determines which operation mode of a camera function is selected, based on the input to the operating unit 19 (step S26).

As a result, if a map mode is selected, the CPU 10 reads a certain range of a map image around the current position from the map database 26, and draws the map image in a display memory in the display 17 (step S27).

Further, the CPU 10 reads travel route data from the travel route storage unit 24 and draws a line image of a travel route in the above display memory (step S28).

Furthermore, the CPU 10 draws in the above display memory an image of an image capturing place mark representing that a captured image is stored being associated with the corresponding position in the map image, based on position data of the image capturing place added to a plurality of pieces of captured image data stored in the captured image storage unit 25 (step S29).

Still further, the CPU 10 returns to step S2.

That is, when the map mode is selected, the CPU 10 repeatedly executes the above processing in steps S27 to S29 at short intervals.

In this way, when a user travels, the CPU 10 allows the map image to be scrolled on the display 17 and allows a travel route and image capturing place mark to be displayed on a map image around the current position.

Further, as a result of determination processing in step S26, if an image capturing mode is selected, the CPU 10 checks that a shutter button of the operating unit 19 is pressed (step S30).

Furthermore, if the shutter button is not pressed, the CPU 10 performs processing of displaying an image captured by the image capturing unit 21 as is on the display 17 (step S31).

Still further, the CPU 10 returns to step S2.

On the other hand, if the shutter button is pressed, the CPU 10 converts a captured image taken in by the image capturing unit 21 at this point of time, into captured image data in a predetermined format (step S32).

Further, the CPU 10 adds position data acquired by the positioning performed immediately before, to captured image data, and registers the data file name of this captured image data to the item of the captured image of travel route data (step S33).

Then, the CPU 10 calculates azimuth direction information representing an image capturing direction based on the output from the triaxial geomagnetic sensor 15, and adds this azimuth direction information to image captured image data (step S34).

Further, the CPU 10 returns to step S2.

That is, when the image capturing mode is selected, the CPU 10 repeatedly executes the processing in step S31 at short intervals until the shutter button is pressed and allows a finder image to be displayed on the display 17. The CPU 10 executes processing in steps S31 to S34 when the shutter button is pressed to perform image capturing processing.

Further, as a result of determination processing in step S26, if a playback mode is selected, the CPU 10 further checks the selected display mode (step S35).

Furthermore, if a captured image display is selected, the CPU 10 executes captured image display processing (step S36) to selectively display captured image data stored in the captured image storage unit 25, on the display 17, according to an operation input to the operating unit 19.

That is, the processing in step S36 is repeatedly executed at short intervals, so that a captured image is selectively output to and displayed on the display 17 according to a user's operation.

On the other hand, if a map slide display is selected as a result of the determination processing in step S35, the CPU 10 executes processing of the map slide display described below.

Map Slide Display

FIGS. 7 and 8 are explanatory views illustrating examples of display images in the map slide display according to the first embodiment.

A map slide display mode is a mode in which a captured image is displayed every time an indicated position matches a corresponding position of an image capturing place while following the travel route on the map image.

Figure 6:
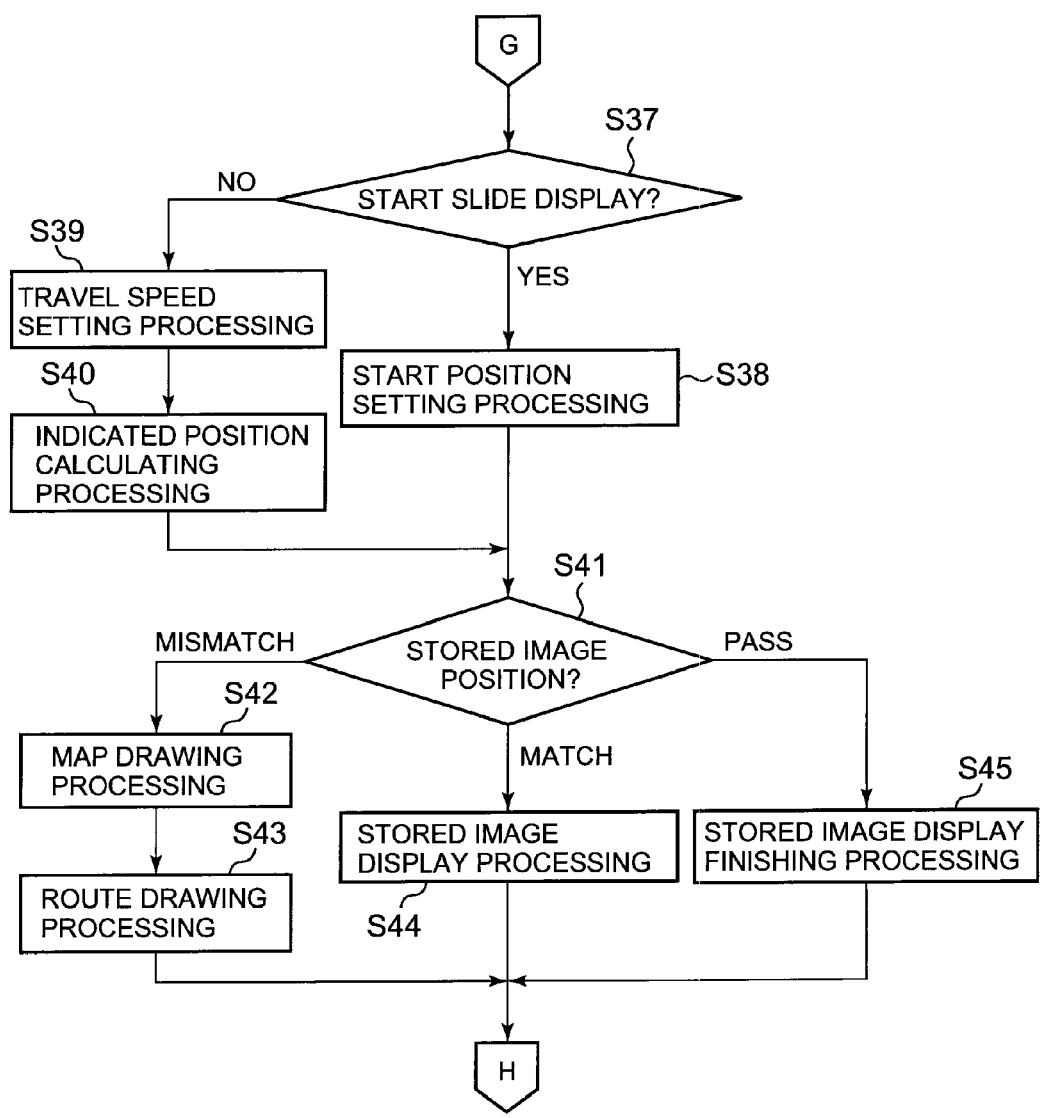
FIG. 6 is a fourth part of the flowchart of the control processing according to the first embodiment executed by the CPU.

The processing in steps S37 to S45 in FIG. 6 constitutes an image playback unit which realizes the map slide display.

When the map slide display is selected in the playback mode and the CPU 10 moves on to step S37 (FIG. 6), the CPU 10 first determines whether this map slide processing has just started or is in the middle of processing (step S37).

Further, the CPU 10 performs setting processing (step S38) for the start position from which the travel route is followed if the map slide display has just started.

The setting of the start position may be made in such a way that the start position is set to the start position of the travel route of a day in the standard setting, and the start position may be changed by a user to a random place on the travel route according to the operation to the operating unit 19, for example.

On the other hand, if it is in the middle of the map slide display as a result of the determination in step S37, the CPU 10 sets the travel speed at which the travel route is followed (step S39) and calculates the position to be indicated next along the travel route (step S40).

The setting of the travel speed in step S39 may be performed in such a way that an actual travel speed around a place on the travel route is calculated based on travel route data in the travel route storage unit 24 and the travel speed is set in proportion to this actual travel speed, for example.

Further, the setting of the travel speed in step S39 may be performed in such a way that the travel speed is increased or decreased when an operation to the operating unit 19 to increase or decrease the speed is input.

Further, processing of calculating the position to be indicated next in step S40 is the processing of calculating a position which is away from the currently-displayed position by the length according to the travel speed set in step S39, along the travel route.

In step S38 or S40, when the position to be indicated is determined, the CPU 10 then determines whether the indicated position and the image capturing place of a stored captured image matches (whether the image capturing place is positioned within a certain range along the travel route) (step S41).

This determination can be made by, for example, checking item data of the captured image of travel route data.

Alternatively, the CPU 10 can compare position data added to captured image data and position data of the position to be indicated next to check whether, nearby and on the travel route, there is captured image data whose position data overlaps.

Further, if the indicated position does not match with the corresponding position of the image capturing place, the CPU 10 extracts a map image around the position to be indicated next from the map database 26 and draws the map image in the display memory of the display 17 (step S42).

Further, the CPU 10 draws a line image of the travel route from the start position to the position to be indicated next in the display memory (step S43).

Further, the CPU 10 returns to step S2.

That is, the CPU 10 repeatedly executes processing of updating the indicated position in above steps S39 and S40 and processing of displaying the map image in steps S42 and S43 in a series of loop processing.

In this way, the CPU 10 displays on the display 17 a moving mark, which follows the travel route, to allow a map image to be scrolled.

The above processing in steps S42 and S43 constitutes a movement display control unit.

Figure 7A:
FIGS. 7A-7D are a first part of explanatory views illustrating an example of display images in map slide display according to the first embodiment.

In examples in FIGS. 7A-7D and 8A-8D, the start position is indicated by an arrow mark 81 in the center of image display in FIG. 7A. Subsequently, a map image is displayed while being scrolled while the arrow mark 81 follows the travel route to provide image display in FIG. 7B.

The direction indicated by the arrow mark 81 indicates the travel direction.

A line image 82 representing a travel route along which the arrow mark 81 follows is shown.

Figure 7B:
Figure 7C:
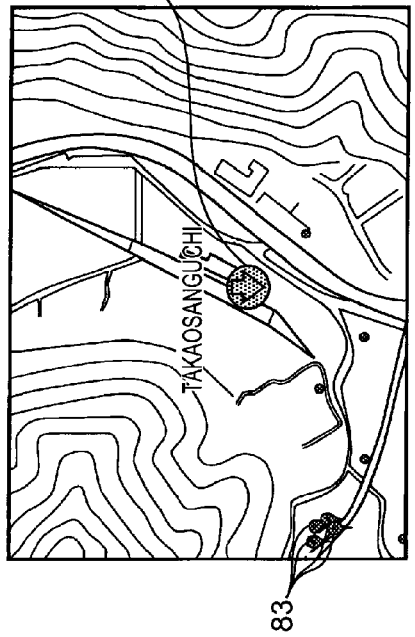
Figure 7D:
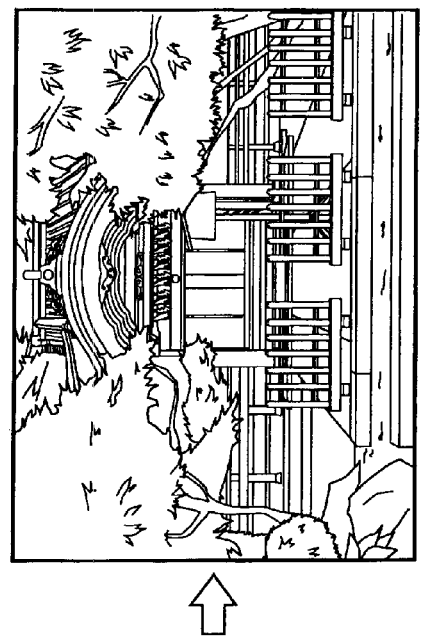

Further, as illustrated in FIGS. 7A, 7B, and 7D, image capturing place marks 83 representing image capturing positions of stored captured images may be displayed with the image capturing place marks 83 being overlapped on the map image.

On the other hand, when it is determined that the position to be indicated next matches the corresponding position of an image capturing place of a stored captured image as a result of the determination processing in step S41, the CPU 10 performs processing of reading this captured image data from the captured image storage unit 25 and displaying the read image data on the display 17 (step S44: image display control unit).

Further, the CPU 10 returns to step S2.

Furthermore, when it is determined that the position to be indicated next passes the corresponding position of an image capturing place of a captured image and does not match the corresponding position of the image capturing place any more as a result of the determination processing in step S41, the CPU 10 finishes displaying a captured image and outputs transition display for switching to display of a map image, to the display 17 (step S45).

Still further, the CPU 10 returns to step S2.

That is, the CPU 10 repeatedly executes display processing of following the travel route in steps S42 and S43, in a series of loop processing.

Figure 8A:
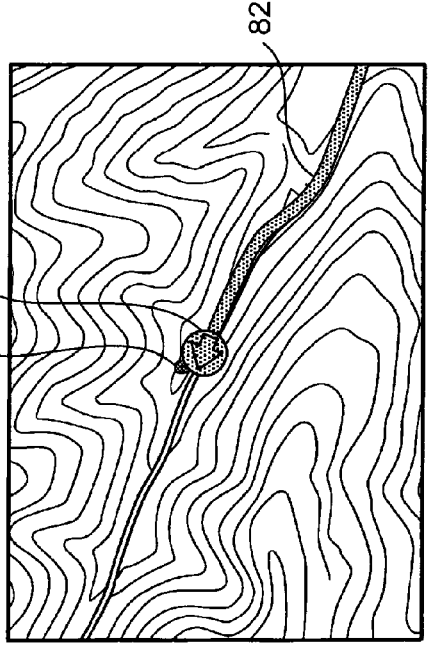
FIGS. 8A-8D are a second part of the explanatory views illustrating an example of display images in the map slide display according to the first embodiment.
Figure 8B:
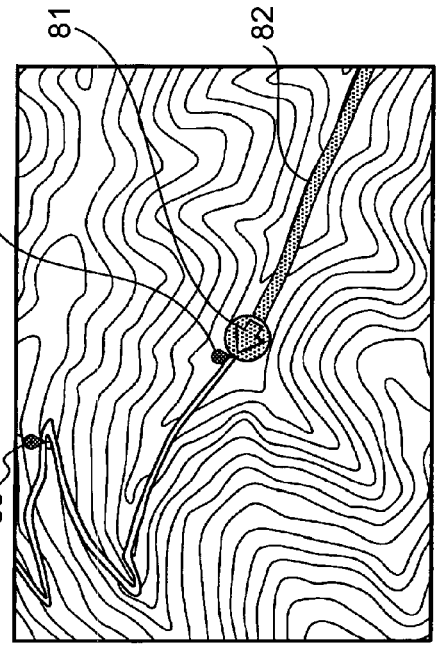
Figure 8C:
Figure 8D:
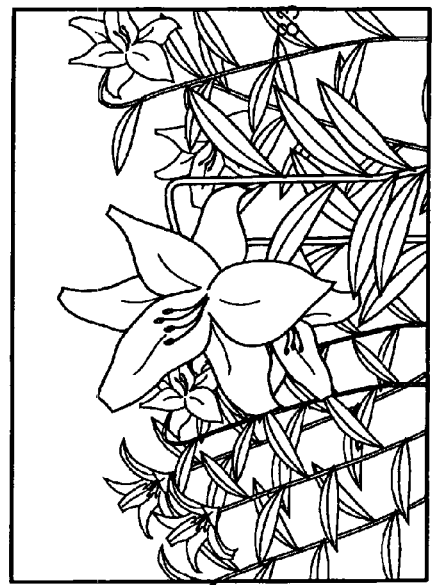

Further, when an image capturing place of a captured image substantially overlaps the position of the arrow mark 81, the CPU 10 displays this captured image as illustrated in FIG. 7B→FIG. 7C→FIG. 7D and in FIG. 8B→FIG. 8C→FIG. 8D.

Subsequently, the CPU 10 displays a map image again.

In addition, when a plurality of captured images captured at substantially the same image capturing place, the CPU 10 may display a map image by inserting the map image between the captured images while switching the captured images. That is, the display is performed in order of FIG. 7B→FIG. 7C→FIG. 7D→FIG. 8A as illustrated, for example.

Alternatively, the CPU 10 may sequentially switch a plurality of captured images and display them without inserting an output of a map image in between.

Further, when a captured image is displayed, the CPU 10 may perform control to switch to a next captured image when a certain period of time passes after the captured image is displayed or switch to the next captured image earlier according to a user's operation to the operating unit 19.

As described above, the image capturing device 1 according to the first embodiment performs the above map slide display, so as to display a mark moving following a travel route on a map image and, when the mark comes close to an image capturing place on the travel route of the stored image data, display the image of the image data.

Consequently, even when images are intermittently captured while a user travels, a user can enjoy looking at the images captured during the travel while looking back on the situation on the way, by looking at the display which enables the user to follow the travel route.

That is, the image capturing device 1 according to the first embodiment brings about an effect that a user can enjoy playback of images as if he or she actually experienced the travel through the whole process of the travel.

Further, the image capturing device 1 according to the first embodiment generates travel route data by automatically performing positioning while traveling, and captures images according to a user's operation and stores the captured image data and position data, with both of the data being associated with each other.

Furthermore, the image capturing device 1 according to the first embodiment performs the above map slide display based on travel route data and captured image data accumulated by these functions.

Consequently, the image capturing device 1 according to the first embodiment can both capture images and play back the map slide display with only one image capturing device 1.

Second Embodiment

The image capturing device 1 according to a second embodiment differs from the first embodiment in content of the map slide display, and the other configurations are substantially the same as that of the first embodiment.

Hence, only different parts will be described in detail.

Figure 9:
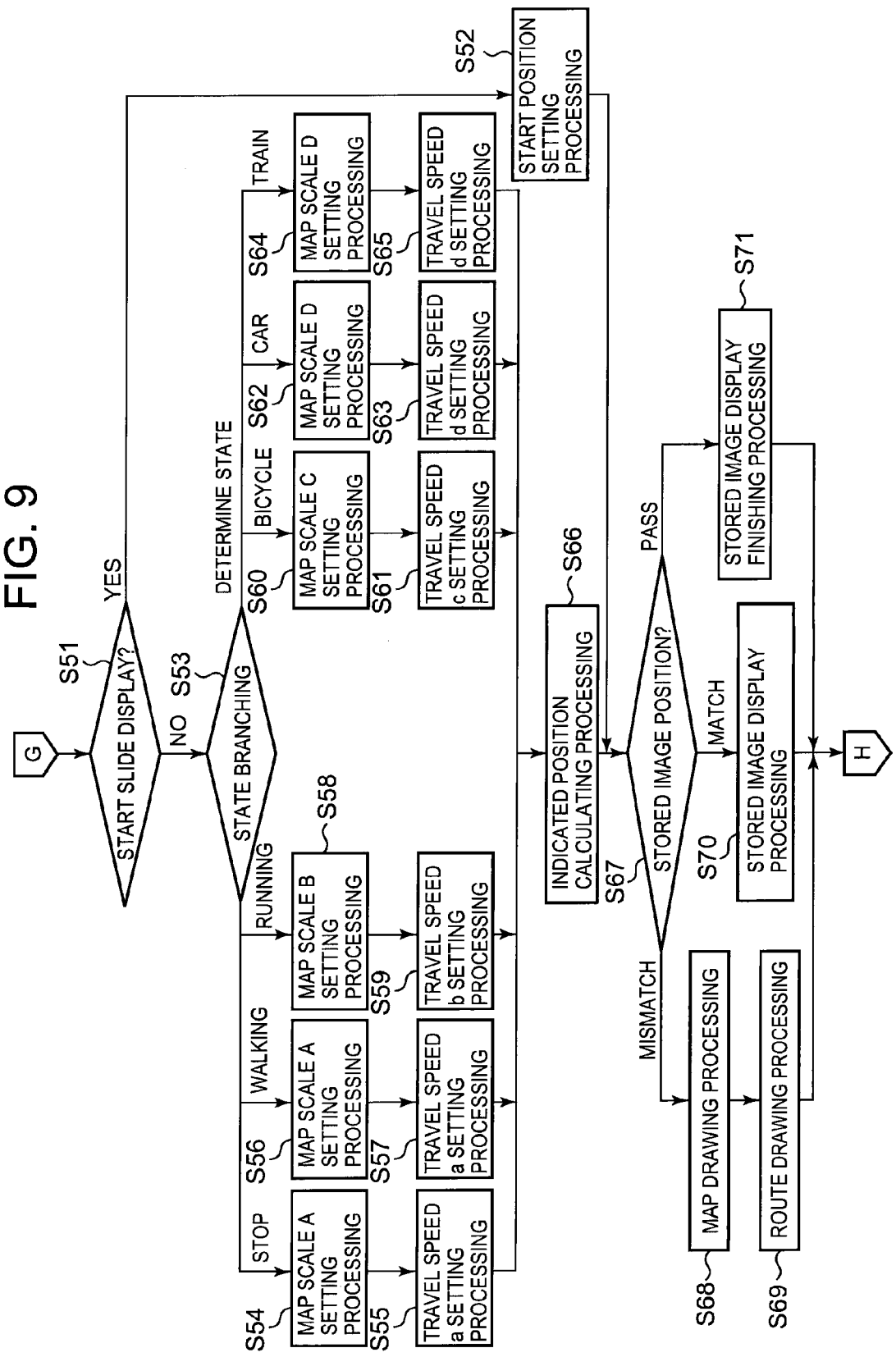
FIG. 9 is a flowchart illustrating a control procedure of the map slide display in control processing according to a second embodiment.

FIG. 9 is a flowchart for the map slide display in control processing according to the second embodiment.

The parts other than the part in FIG. 9 in the control processing according to the second embodiment will be the same as the control processing according to the first embodiment illustrated in FIGS. 3 to 5.

Processing of the map slide display in FIG. 9 is different from the processing in the first embodiment in that the setting of scale of a map image to be displayed and the setting of the speed at which a travel route is followed is changed according to a user's travel means in actual travel, in steps S53 to S65.

The other processing in steps S51, S52 and S66 to S71 are the same as the processing in steps S37, S38 and S40 to S45 in the first embodiment (FIG. 6).

That is, in the image capturing device 1 according to the second embodiment, when the map slide display is selected in the playback mode, the CPU 10 repeatedly executes processing subsequent to step S51 in FIG. 9 at short intervals.

Further, when the processing moves on to "NO" as a result of the determination processing in step S51, after the stage of starting the processing of the map slide display is finished, the CPU 10 determines the state with regard to travel means at a currently-indicated position along a travel route, based on travel means data in travel route data (step S53: travel means identification unit).

As a result of this state determination, if the state is determined to be the stop state, the CPU 10 sets the scale of the map image to a large scale A (step S54), and sets the travel speed at which the travel route is followed to a low speed a in association with the large scale A (step S55).

On the other hand, when the state is determined to be walking, the CPU 10 also sets the scale of the map image to the large scale A and sets the travel speed to the low speed a (steps S56 and S57).

Furthermore, when the state is determined to be running, the CPU 10 sets the scale of the map image to a slightly large scale B and sets the travel speed to a slightly low speed b (steps S58 and S59).

Further, when the state is determined to be traveling by bicycle, the CPU 10 sets the scale of the map image to a middle scale C and sets the travel speed to a middle speed c (steps S60 and S61).

Furthermore, when the state is determined to be traveling by car or train, the CPU 10 sets the scale of the map image to a small scale D and sets the travel speed to a high speed d (steps S62 to S65).

That is, when the state is determined to be travel means having a low travel speed, the CPU 10 uses a map image of large scale and sets the travel speed to be low to prevent the map image from moving too much.

On the other hand, when the state is determined to be travel means having a high travel speed, the CPU 10 uses a map image of small scale and sets the travel speed to be high to move the map image adequately.

The above processing in steps S54 to S65 constitutes a display mode changing unit.

Further, after making the above setting, the CPU 10 then calculates a position which is away from the previously-indicated position by the length according to a travel speed along the travel route, as the position to be indicated next (step S66).

Further, when position to be indicated next does not overlap an image capturing place as a result of the determination processing in step S67, the CPU 10 performs processing to display the map image having the above scale and travel route on the display 17 (steps S68 and S69).

FIGS. 10A-10D and 11A-11D are explanatory views illustrating examples of display images in the map slide display according to the second embodiment.

In addition, in the map slide display according to the second embodiment, the line image 82 indicating the travel route is shown by a different type of line according to travel means, and the start position to the end of the travel route is displayed.

The CPU 10 repeatedly executes the above processing subsequent to step S51 at short intervals. When, for example, there is travel route data in which the travel means is changed from walking to train and train to walking, the CPU 10 first displays a map image having a large scale as illustrated in FIG. 10A in a walking section, and provides scroll display of a map image by setting the speed at which the arrow mark 81 follows the travel route to a speed corresponding to walking.

Further, in a train section, the CPU 10 changes the scale of the map image to a small scale as illustrated in FIGS. 10B, 10C and 10D, changes the speed at which the arrow mark 81 follows the travel route to a speed corresponding to traveling by train, and provides scroll display of the map image.

Figure 11B:
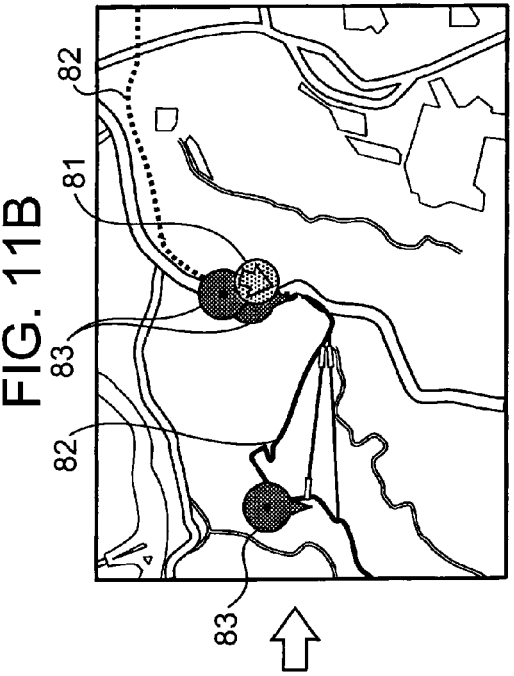
FIGS. 11A-11D are a second part of the explanatory views illustrating an example of display images in the map slide display according to the second embodiment.
Figure 11D:
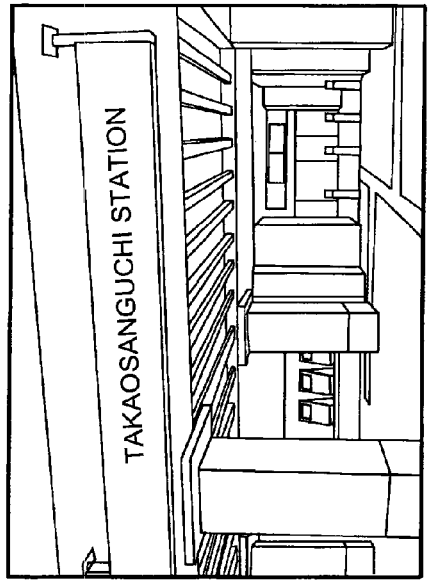
Figure 11A:
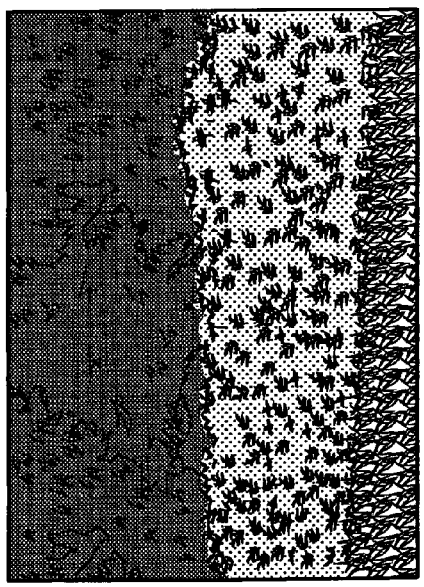
Figure 11C:
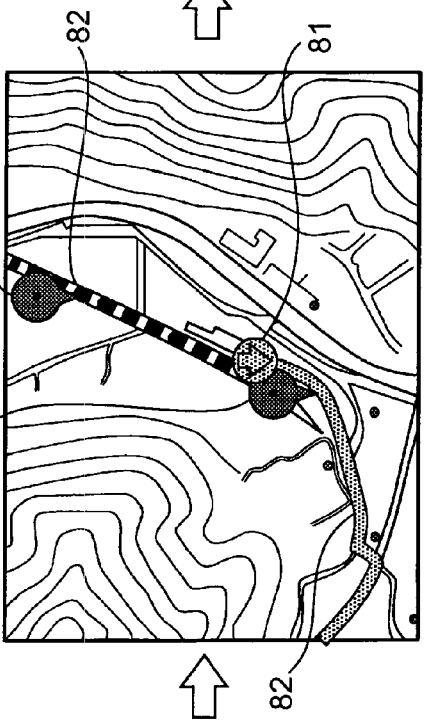

Also, when the travel means changes from train to walking, the CPU 10 changes the scale of the map image and the travel speed in the direction opposite to the above as illustrated in FIG. 11B→FIG. 11C to provide scroll display of the map image.

Further, as illustrated in FIG. 10D→FIG. 11A and FIG. 11C→FIG. 11D, the CPU 10 displays captured images every time an indicated position on the map and an image capturing place overlap during the process of following the travel route.

As described above, the map slide display processing of the image capturing device 1 according to the second embodiment can provide an effect that a user can enjoy looking at the images captured during the travel while looking back on the situation on the way, by looking at the display which enables the user to follow the travel route.

Further, the image capturing device 1 can provide an effect that a user can enjoy playback of images as if he or she actually experienced the travel through the whole process of the travel.

Furthermore, the image capturing device 1 according to the second embodiment changes a display mode of a map image, in which a travel route is followed, according to an actual travel means upon the map slide display, so that a user can also enjoy looking at captured images while looking back on the change of the travel means.

Still further, the travel means is identified upon the map slide display based on the travel means data in the travel route data, thereby enabling accurate identification without load.

Still further, a scale of the map image and a speed at which the travel route is followed are changed as a change of a display mode of a map image according to an actual travel means, so that the image capturing device 1 according to the second embodiment can make it easy to see movement of a mark which follows the travel route, keeping with a change of an actual travel means.

Still further, in the image capturing device 1 according to the second embodiment, the CPU 10 generates travel route data including travel means data by automatically performing position processing or processing to determine travel means while traveling.

Moreover, the CPU 10 captures images according to a user's operation and stores the captured images, with each of the captured images being associated with position data.

Further, based on travel route data and captured image data accumulated by these functions, the map slide display is performed in which a display mode is changed according to the above travel means.

Consequently, the image capturing device 1 according to the second embodiment can capture images and play back the map slide display with only one image capturing device 1.

In addition, the present invention is by no means limited to the above embodiments and can be variously changed.

For example, although the present embodiments employ the method for providing scroll display of a map image in such a way that a position indicated by the arrow mark 81 is placed at the center of an image at all times, the method is by no means limited to this method.

For example, the following method may also be employed; that is, a method of using a combination of a display where a mark which indicates a travel position moves along a travel route on a still map image, and a display where a display range of the map image shifts in a phased manner according to the travel route.

Further, although position data of an image capturing place is added to captured image data in the above embodiments, the adding of the position data may be omitted. In this case, captured image data and position data of an image capturing place may be associated with each other only by using data of captured image items included in travel route data.

Further, although a scheme has been described in the above embodiments which determines travel means by means of the state determination processing unit 22 during travel and allows the travel route storage unit 24 to store travel means data, and identifies the travel means at each travel place according to travel means data included in this travel route data during the map slide display, the scheme for identifying the travel means during the map slide display is by no means limited to this.

For example, the image capturing device 1 can calculate the travel speed from time data and position data in travel route data and identify the travel means of stop, walking, running, traveling by bicycle, car or train based on this travel speed.

Further, although the image capturing device illustrated in the above embodiments is configured so that the device itself generates travel route data and captured image data, the playback display device according to the present invention may only receive travel route data and captured image data from outside and play back the received data.

In addition, the details described in the embodiments can be adequately changed without deviating from the spirit of the invention.

The entire disclosures of Japanese Patent Application No. 2010-206244 filed on Sep. 15, 2010 and Japanese Patent Application No. 2010-249324 filed on Nov. 8, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A playback display device comprising:
   a display unit;
   a data storage unit which stores data representing a travel route and a plurality of pieces of image data each associated with an image capturing place;
   a movement display control unit which displays a mark moving on a map displayed on the display unit based on the data representing the travel route;
   an image playback unit which displays image data when, while the movement display control unit displays the mark moving on the map, a displayed position of the mark matches a corresponding position of the image capturing place associated with the image data;
   a travel means identification unit which identifies travel means at each place on the travel route; and
   a display mode changing unit which changes a scale of the map on which the mark is displayed, based on the travel means identified by the travel means identification unit.

2. A playback display method for displaying an image by using a display unit and a data storage unit which stores data representing a travel route and a plurality of pieces of image data each associated with an image capturing place, the method comprising:
   displaying a mark moving along the travel route on a map displayed on the display unit based on the data representing the travel route;

displaying image data when, while displaying the mark moving along the travel route on the map, a displayed position of the mark matches a corresponding position of the image capturing place associated with the image data;

identifying travel means at each place on the travel route; and changing a scale of the map on which the mark is displayed, based on the identified travel means.

3. A non-transitory computer readable storage medium having recorded thereon a computer program for controlling a computer, the computer being connected to a display unit and a data storage unit which stores data representing a travel route and a plurality of pieces of image data each associated with an image capturing place, and the program controlling the computer to function as units comprising:

a movement display control unit which displays a mark moving on a map displayed on the display unit based on the data representing the travel route;

an image playback unit which displays image data when, while the movement display control unit displays the mark moving on the map, a displayed position of the mark matches a corresponding position of the image capturing place associated with the image data;

a travel means identification unit which identifies travel means at each place on the travel route; and a display mode changing unit which changes a scale of the map on which the mark is displayed, based on the travel means identified by the travel means identification unit.

4. A playback device comprising:

a display unit;

a data storage unit which stores data representing a travel route and a plurality of pieces of image data each associated with an image capturing place;

a movement display control unit which displays a mark moving on a map displayed on the display unit based on the data representing the travel route;

an image playback unit which displays image data when, while the movement display control unit displays the mark moving on the map, a displayed position of the mark matches a corresponding position of the image capturing place associated with the image data;

a travel means identification unit which identifies travel means at each place on the travel route; and a display mode changing unit which changes a type of line representing the travel route on the map on which the mark is displayed, based on the travel means identified by the travel means identification unit.

5. A playback display method for displaying an image by using a display unit and a data storage unit which stores data representing a travel route and a plurality of pieces of image data each associated with an image capturing place, the method comprising:

displaying a mark moving along the travel route on a map displayed on the display unit based on the data representing the travel route;

displaying image data when, while displaying the mark moving along the travel route, a displayed position of the mark matches a corresponding position of the image capturing place associated with the image data;

identifying travel means at each place on the travel route; and changing a type of a line representing the travel route on the map on which the mark is displayed, based on the identified travel means.

6. A non-transitory computer readable storage medium having recorded thereon a computer program for controlling a computer, the computer being connected to a display unit and a data storage unit which stores data representing a travel route and a plurality of pieces of image data each associated with an image capturing place, and the program controlling the computer to function as units comprising:

a movement display control unit which displays a mark moving on a map displayed on the display unit based on the data representing the travel route;

an image playback unit which displays image data when, while the movement display control unit displays the mark moving on the map, a displayed position of the mark matches a corresponding position of the image data capturing place associated with the image data;

a travel means identification unit which identifies travel means at each place on the travel route; and a display mode changing unit which changes a type of a line representing the travel route on the map on which the mark is displayed, based on the travel means identified by the travel means identification unit.

* * * * *